(12) United States Patent
O'Rourke

(10) Patent No.: US 7,111,710 B2
(45) Date of Patent: Sep. 26, 2006

(54) BRAKING SURFACE COOLING ASSEMBLY AND BRAKE PERFORMANCE ENHANCING METHODS

(75) Inventor: Thomas W. O'Rourke, Boulder, CO (US)

(73) Assignee: Ingalls Engineering Company, Inc., Louisville, CO (US)

( * ) Notice: Subject to any disclaimer, the term of this patent is extended or adjusted under 35 U.S.C. 154(b) by 0 days.

(21) Appl. No.: 10/894,067

(22) Filed: Jul. 19, 2004

(65) Prior Publication Data

US 2006/0011425 A1  Jan. 19, 2006

(51) Int. Cl.
*B60L 7/28* (2006.01)

(52) U.S. Cl. .............. 188/218 XL; 188/264 A; 188/264 AA

(58) Field of Classification Search ........... 188/264 A, 188/264 AA, 218 XL
See application file for complete search history.

(56) References Cited

U.S. PATENT DOCUMENTS

| | | | | |
|---|---|---|---|---|
| 1,717,522 A | * | 6/1929 | Rosenberg | .............. 188/264 A |
| 3,277,985 A | * | 10/1966 | Caskey | ................. 188/264 AA |
| 3,592,297 A | * | 7/1971 | Leffert | ....................... 188/71.6 |
| 4,232,763 A | * | 11/1980 | Klaue | ....................... 188/18 A |
| 4,811,822 A | * | 3/1989 | Estaque | .................. 188/264 A |
| 5,006,676 A | * | 4/1991 | Bogut et al. | .......... 188/218 XL |
| 5,284,227 A | * | 2/1994 | Pelfrey | ...................... 188/71.1 |
| 5,826,685 A | * | 10/1998 | Engle | ...................... 188/264 A |
| 6,206,151 B1 | * | 3/2001 | Nakamura | .............. 188/250 B |
| 6,536,564 B1 | * | 3/2003 | Garfinkel et al. | ....... 188/264 A |
| 6,578,678 B1 | * | 6/2003 | Lee | ............................ 188/71.6 |
| 6,880,683 B1 | * | 4/2005 | Miles | .................. 188/218 XL |

OTHER PUBLICATIONS

Carroll Smith, Prepare to Win, 1975, pp. 79 and 80 (Solid Disc Cooling).

* cited by examiner

*Primary Examiner*—Christopher P. Schwartz
(74) *Attorney, Agent, or Firm*—Harold A. Burdick

(57) ABSTRACT

Vanes positioned immediately adjacent the swept area of a moving friction brake rotor induce a flow of air over the rotor by displacing the boundary layer of gases from the rotor surface and conducting such layer along the intercepting surface of the vane, and thus inducing a flow of cooler air over the rotor. Under heavy braking, friction pad particles and substantial quantities of thermal energy in the superheated gases of the boundary layer are removed by the vanes.

20 Claims, 5 Drawing Sheets

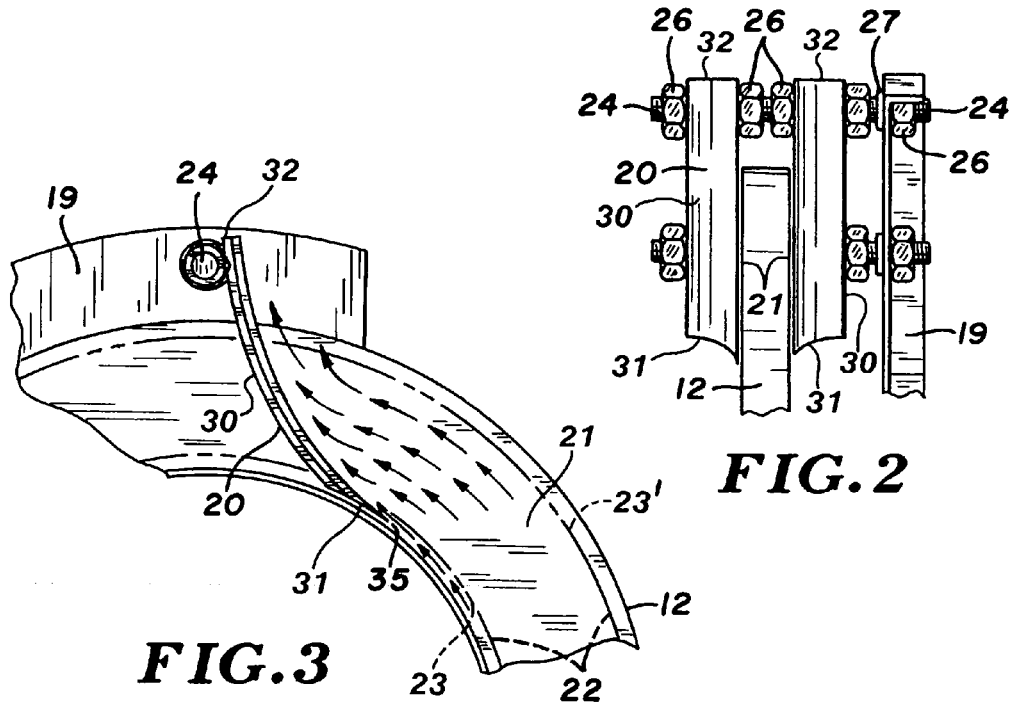
FIG.2
FIG.3
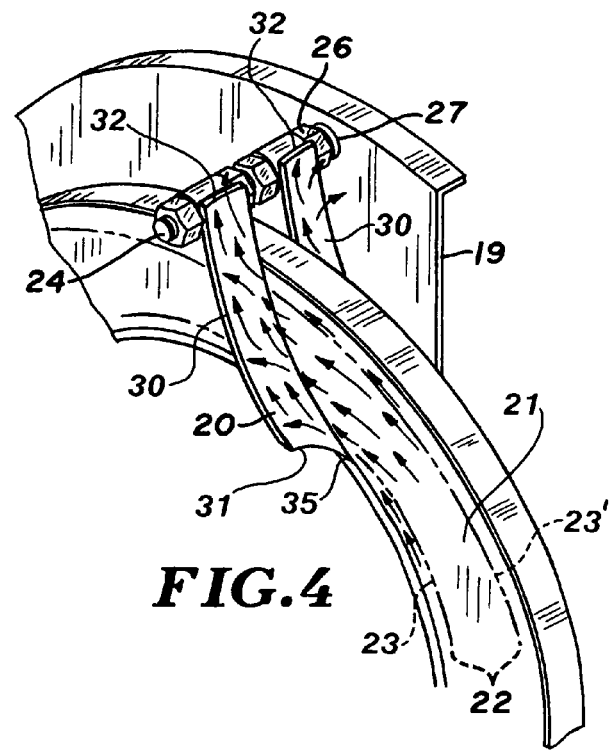
FIG.4

BRAKING SURFACE COOLING ASSEMBLY AND BRAKE PERFORMANCE ENHANCING METHODS

FIELD OF THE INVENTION

This invention relates to frictional brake assemblies and methods, and, more particularly, relates to such assemblies or methods providing for increased rate of dissipation of thermal energy to reduce operating temperature.

BACKGROUND OF THE INVENTION

Friction brakes are widely used on land and air vehicles as well as with stationary machinery. The following discussion will be largely in the context of the demanding use with high performance land vehicles, but the contemplated utility is with all friction brakes.

Broadly defined, friction brakes function by pressing a friction pad against a moving surface thus converting kinetic energy into thermal energy. Many embodiments of such brakes are well known in the art. The moving surface can be a disc, drum, wheel surface etc., but will be herein referred to generically as a rotor. As is known, the movable friction pads may be carried by calipers or on expanding shoes or the like. Known pad actuating means include hydraulic, pneumatic, mechanical, electromagnetic actuators, etc. In all instances the operation of these braking mechanisms will generate thermal energy, often including large quantities of thermal energy, while slowing or stopping the vehicle, thus reducing or diminishing kinetic energy. The ability to dissipate such thermal energy to the atmosphere is typically the ultimate limiting factor in the effectiveness of a given braking assembly or mechanism, with the heat sink capacity of the assembly being the peak-use-limiting factor. The following discussion will be primarily in the context of the ubiquitous disc/caliper brake structure. However, those skilled in the art will readily recognize that the principles are equally applicable to other iterations of friction brakes.

In a given braking occasion, the rotor ultimately dissipates most of the thermal energy to the atmosphere, serving initially as a heat sink and ultimately as a member to transfer the thermal energy to the atmosphere through radiation and convection. Friction pads are of lesser mass and in thermal contact with various structures adversely affected by heat. Accordingly, the friction pad is of low thermal conductivity in order that the thermal energy preferentially flows into the rotor. In all brake assembly components and friction pads in particular, wear is accelerated by heat inherently generated by frictional contact. This heat is carried as the hot gases and particles present within the rotor boundary layer are passed on to or delivered to the leading edge of the friction pad.

Rotor cooling conventionally relies primarily upon convection utilizing the relatively large area of the rotor body. Both vehicle motion and rotation of the rotor moves this body through the air. Often internal rotor fins, which both draw cool air to the rotor and which move through the air to generate turbulence and enhance convection have been used to augment convective cooling. However, to deal with the extreme temperatures developed at the friction pad, the rotor first serves as a heat sink to distribute the thermal energy throughout the mass or structure of the rotor body. For better management of the heat, rotor bodies tend to have a large mass.

Cool air from a vehicle slipstream, or from a blower, can be ducted to the rotor to improve cooling. Often, when air is to be ducted to the rotor, the brake requirements are typically demanding, as in a racing or high performance vehicle. In such instances the rotor is also large to serve as a heat sink and internally finned to facilitate thermal energy transfer to the atmosphere.

By way of example, a typical automotive disc brake includes a cylindrical rotor disc of eight to twelve inches in diameter, the disc being acted upon on opposite sides by opposed friction pads carried in calipers and activated by a hydraulic circuit. Certain rotor discs may be solid, with these being used in relatively light duty applications since solid rotors tend to be of lower thermal mass and modest surface area, and thus are more easily warped by high temperatures. More typically, the disc rotor will be ventilated, i.e. have an open center bridged by fins to pump air through the disc rotor and reject or dissipate a major portion of the brake heat through such fins. Such disc rotors essentially conduct heat from the surfaces which contact the friction pads, to the finned interior of the disc rotor structure. Accordingly, the disc must be heavy to serve as a heat sink and to provide structural strength in areas between the friction pads and the bridging fins.

Weight is generally undesirable in any vehicle, with rotating, unsprung weight being particularly objectionable. Brakes usually constitute unsprung weight which compromises fuel efficiency, ride and handling. The energy expended to spin a heavy rotor is generally wasted and adds to the overall energy that the brakes must convert to thermal energy.

In a worst case instance, such as an aircraft during landing, the craft or vehicle may be brought to a sudden stop from a high velocity. Without the benefit of a slipstream and moving rotor fins when stopped, only the thermal mass of the rotors and adjacent structure are available to serve as a heat sink to absorb the massive quantity of thermal energy generated by such an event. Accordingly, such rotors must have considerable mass, and thus be heavy.

A land vehicle descending a long grade must deal with potential energy that, in time, can easily create an amount of thermal energy sufficient to swamp the heat sink capabilities of a rotor. Heat rejection through radiation and convection are the only means for preserving the effectiveness of the brakes. Braking effectiveness is easily compromised and may be lost under adverse heat conditions.

In particular, under certain conditions a boundary layer of fluid moving with the rotor (i.e., a layer of fluid that actually adheres to the rotor braking surface during rotor rotation) may become heated to extreme temperatures along the swept area and carries a substantial quantity of thermal energy during aggressive braking. This ring of extremely hot air is known as the "ring of fire". The boundary layer, or ring, may also carry significant amounts of friction pad particulate. In conventional braking assemblies, this boundary layer travels with the rotor until it is disrupted by the leading edge of the friction pad. While inherent in such conventional designs, this is highly undesirable for several reasons. The rotor has a much higher coefficient of thermal conductivity than that of the layer of superheated air. Thus thermal energy in the superheated "ring of fire" is to a substantial degree transferred to the rotor, but, with rotor travel, is also returned to the leading edge of the friction pad to heat the pad and its actuating structure. Episodes of brake fade are increased and pad wear is substantially accelerated at high temperatures. Hydraulic fluid lodged in lines located near actuating mechanisms is subject to boiling.

The boundary layer phenomenon is well known. At the interface between a fluid and the surface of a solid, molecular attraction bonds the initial layer or film of fluid firmly to this surface. Subsequent layers of fluid molecules are cohered to the initial layer. Thus a relatively thin but appreciable volume of fluid is formed. This adhered boundary layer volume moves with the solid.

SUMMARY OF THE INVENTION

The present invention relates to a new and fundamentally different mechanism and methods for dissipating thermal energy from friction brakes. Thermal energy is contained in a fluid boundary layer attached to the rotational braking surface of the rotor, and is dissipated by intercepting and guiding the boundary layer away from the rotor.

The rotational braking surface cooling assembly of this invention is adaptable for use in association with a most common varieties of vehicle brake assemblies that include a nonrotational mounting support, a rotary braking surface having a normal forward direction of rotation, and a friction pad mounted for controlled intermittent engagement with the rotary braking surface. The rotational braking surface cooling assembly has at least one cooling vane and a positioning structure associated with the vane for nonrotational positioning of the vane in an angled disposition relative to the rotational braking surface. The positioning is selected so that the vane can be in position to intercept and redirect (away from the rotational braking surface) the fluid boundary layer, especially at the swept area between the braking surface and the brake assembly friction pad.

The positioning structure, and thus the fluid guiding cooling vane, is securable to the brake assembly mounting support. The cooling vane includes an elongated body having opposed ends with opposed leading and trailing surfaces extending between the ends of the elongated body. The effective positioning of the vane preferably includes disposition of the elongated vane body relative to the rotary braking surface angled in a radial direction and/or a rake direction, with the leading surface of the elongated body immediately adjacent to the swept area of the rotary braking surface with at least a portion thereof within the boundary layer. The elongated body preferably has a length at least sufficient to extend entirely across the swept area adjacent thereto.

The boundary layer including a ring or annulus of air and any entrained gases and/or particles from heated friction pads moving with the rotor boundary layer impinges upon the nonrotating vane of the present invention, with the air from the "ring of fire" being conducted along the surface of the vane and away from the rotor. This displacement, in turn, induces airflow from other surface areas of the rotor. This unique mechanism for removal of the heated boundary layer dissipates the energy directly into the atmosphere and relieves the rotor of a substantial portion of the thermal energy burden. The cooling effect created by induced air flow over the vanes is continuous while the rotor is moving, and thus ongoing when the braking event is over.

Preferably, at least one vane per rotor surface, which may be either fixed in place or mounted for axial movement toward and away from the rotor, is positioned closely adjacent the trailing side of the friction pad. The vanes are positioned on both sides of the rotor such that the heated boundary layer air carried with the rotor is promptly and more equally removed from the rotor, with its thermal energy being dissipated as it is being rejected to the atmosphere. Rather than heating the rotor, the energy in the boundary layer air is largely parted or separated from the surface of the rotor and conducted directly to the atmosphere. Heating of the lightweight, low thermal mass vane, while unavoidable to some extent, is minimized. In response to air removal, the vane induces a flow of cool air over the swept area of the rotor to replace the portion of the displaced boundary layer intercepted and diverted by the vane. It is to be noted that the primary heat removal mechanism is initially the diversion by the vane of the heated boundary layer of air moving with the rotor. This system, including the mechanism and the results achieved, differs substantially from merely ducting an airstream towards the rotor or merely disrupting the boundary layer.

Through the present invention, dangerous conditions and harmful situations related to braking assembly overheating can be avoided and braking performance enhanced by constantly removing the air, including air which has become superheated, from the boundary layers adjacent and attached to the rotor by use of at least one air directing vane. Each vane causes displacement of the boundary layer of air moving with the rotor, including particularly heated air. This displacement of air by the vanes brings in cooler air to the brake-pad-swept area of the rotor by replacing the displaced heated air. The cooler air, in turn, removes heat from the rotor surface and rejects it to the atmosphere.

Since the thermal energy carried by the air removed by the vane is not imparted to the rotor, the heat sink function and role of the rotor is reduced or diminished, and the rotor can be made smaller and lighter for a given brake load. Since the airflow over the rotor is improved by the lightweight, nonrotating vane, the rotor can be simpler and less costly as well as being lighter in weight.

The position of the vane relative to the rotor influences performance of the vane. Enhanced performance is attained by preferably angling the body of the vane relative to the adjacent rotor surface in a radial direction and/or rake direction. Once selected, all vanes should be similarly angled. A vane thus angled relative to the rotor radius utilizes the kinetic energy of the boundary layer to move and guide the intercepted gases along the vane. Raking the vane back from the rotor surface induces axial flow of the boundary layer from the rotor and from the edge of the vane to the vane proper, thereby mitigating the heat load of the intercepting surface of the vane. By extending the angled vane below the rotor area swept by the friction pad, cool boundary layer air can be actively flowed along the vane into the heated swept area. To promote cool airflow to the trailing side of the vane, a concave leading surface is preferred, thus preventing the heated boundary layer removed by the raked vane from spilling over the edge of the vane and flowing directly to the trailing surface thereof.

Depending upon the particular friction brake structure and the demands thereon, the vane may be positioned and made securable at a mounting surface in various arrays, configurations or arrangements. A disc rotor braking surface preferable has an equal number of vanes adjacent thereto, either aligned or arcuately offset, to equalize the heat load on each side of the disc rotor. Accordingly a unitary structure having vanes depending from a common support is convenient and economical. Such single component vanes, arrays or assemblies can be readily supported or carried on backing plate mountings.

Alternatively, the vanes may be mounted for movement with the friction pads for close contact with the rotor. When the friction pads are urged into braking contact with the rotor, a trailing vane mounted to the pad will move adjacent to, and even into light contact with, the rotor, for removal of the boundary layer. A similar friction pad-carried vane at the leading side of the friction pad protects the friction pad from residual heat and brake dust moving with or entrained within the rotor boundary layer.

The methods for enhancing performance of a brake assembly of this invention include the steps of rotating the braking member and adhered boundary layer and parting at least a portion of the rotating boundary layer from the braking member. The flow of that portion of the boundary layer is then guided to a position spaced from the swept area, whereby a cooling flow of air is induced over the braking member.

It is therefore an object of this invention to provide improved cooling for brake assemblies.

It is another object of this invention to provide cooling for brake assemblies wherein a fluid boundary layer moving with a rotating braking surface is intercepted and redirected.

It is still another object of this invention to provide a braking surface cooling assembly and methods that reduce the need for a heavy rotor thereby allowing for lighter weight brake assemblies and resultant increased fuel efficiency and improved vehicle ride and handling.

It is yet another object of this invention to provide a rotational braking surface cooling assembly including a cooling vane and a positioning structure associated with the vane for nonrotational positioning of the vane in an angled disposition relative to the rotational braking surface selected to intercept and redirect away from the rotational braking surface a boundary layer of fluid associated with the rotational braking surface during rotation thereof.

It is still another object of this invention to provide a braking surface cooling assembly for use in association with a vehicle brake assembly including a nonrotational mounting support, a rotary braking surface having a normal forward direction of rotation, and a friction pad mounted for controlled intermittent engagement with the rotary braking surface so as to define a generally annular swept area between the pad and the braking surface, wherein an adherent fluid boundary layer moves with the rotary braking surface, the braking surface cooling assembly including at least one fluid guiding cooling vane securable to the mounting support, the cooling vane including an elongated body having opposed ends with opposed leading and trailing surfaces extending between the ends of the elongated body, the elongated body of the vane being adapted for positioning relative to the rotary braking surface angled in at least one of a radial direction and a rake direction with the leading surface of the elongated body immediately adjacent to the swept area of the rotary braking surface to intercept and redirect at least a portion of the fluid boundary layer moving with the rotary braking surface at the swept area, the elongated body having a length at least sufficient to extend entirely across the swept area adjacent thereto.

It is yet another object of this invention to provide a method of enhancing the performance of a brake assembly comprising a rotary braking member having a boundary layer including air adhered thereto, at least one nonrotating friction pad mounted for controlled intermittent braking engagement with the rotary braking member, and at least one annular swept area defined on the braking member by the area contactable by the friction pad, the steps of the method including rotating the braking member and adhered boundary layer, parting at least a portion of the rotating boundary layer from the braking member, and guiding the flow of the portion of the boundary layer to a position spaced from the swept area, whereby a cooling flow of air is induced over the braking member.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 2 is a side view of the vane mounting structure of FIG. 1;

FIG. 3 is partial frontal view illustrating boundary layer flow patterns induced by the vane of FIG. 1;

FIG. 4 is a perspective view of the structure of FIG. 3 illustrating the boundary layer flow patterns of a rotor having an adjacent vane in accordance with the present invention;

DESCRIPTION OF THE INVENTION

Figure 1:
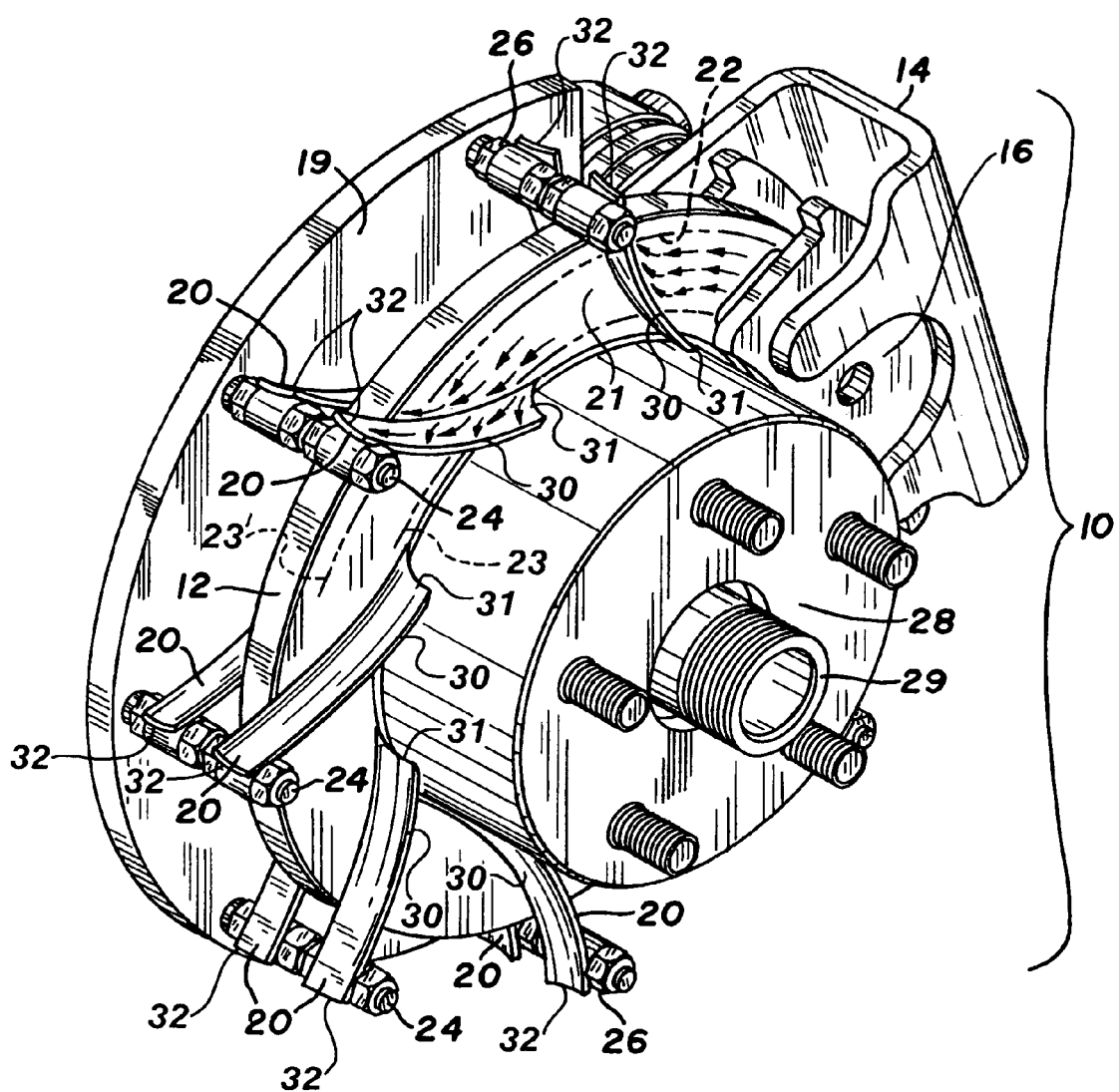
FIG. 1 is a perspective view illustrating a brake assembly including vanes mounted in accordance with the instant invention.

Turning now to the drawings, in which similar components are designated by like reference numerals throughout the various FIGURES, a brake assembly is shown in FIG. 1 and generally designated by reference numeral 10. As shown, brake assembly 10 includes rotary braking member (rotor 12, for example), caliper 14, friction pad assemblies 16 and backing plate 19 (the term "backing plate" as used herein is intended to be interpreted in a comprehensive sense unless otherwise specifically signified, and accordingly is intended to refer to a variety of closely spaced components which are stationary relative to the rotational motion of the rotor and braking surface, including the mounting plates for the friction pads, that is, in this connection and by way of example, friction pads are frequently mounted upon and/or otherwise secured to the mounting plates).

The cooling assembly of this invention includes fluid guiding cooling vanes 20, shown in the FIGURES as being coupled to a mounting support surface such as backing plate 19, positioned closely adjacent to the rotational braking surface 21 of rotor 12 at swept area 22 contacted by friction pads 16. Swept area 22 is defined by inner and outer extents (or edges) 23 and 23' respectively. The term "vane" as used herein is intended to be interpreted as a structure configured and positioned for inducing and guiding a flow of air. Thus it is to be distinguished from a structure which merely disrupts the rotor boundary layer such as a friction pad.

Vanes 20 are carried on threaded rod 24 attached to backing plate 19 by nuts 26 cooperating with shoulder 27 as shown in FIG. 2. Individual vanes 20 are arrayed one each on either side of rotor 12 with the spacing from rotor 12 adjustable by means of nuts 26. Hub 28 carries pilot member 29 which guides the wheel (not shown) onto hub 28 free of interference with vanes 20.

The arrangement of brake assembly 10 includes several optional features for purposes of illustration. Multiple vanes 20 are desirable for optimum performance, but one or two pairs of vanes 20 provide significant results. Also, vanes 20 may be fixedly mounted rather than adjustable. Any of a wide variety of positioning structures suitable to the task could be utilized for location of vanes 20 relative to surface 21. Threaded supports 24 are particularly useful in one embodiment for retrofitting brakes while simpler integral supports may be more convenient for original equipment manufacture or aftermarket installations. Thus, while the concept of providing vanes 20 adjacent rotor 12 is quite simple, numerous variations could be conceived of and are contemplated depending upon the application.

Common to all such variations, however, is the use of positioning structure (such as supports 24 or alternative vane carrying structures as discussed below) for selected nonrotational positioning of vane or vanes 20 in an angled disposition relative to the braking surface. The angled disposition may be in either or both of the radial direction and rake direction (angling in the radial direction refers to offset of the vane relative to the rotational radius of the surface, while angling in the rake direction refers to tilt of the vane axially relative to the perpendicular to the rotor surface, both as illustrated in the FIGURES). The angled deployment is selected to induce movement away from the braking surface of heated air in a boundary layer at the braking surface that may be built up during use of the braking assembly, with the vanes obliquely positioned across the swept area being preferred.

As may be appreciated, the boundary layer of air at adhering to surface 21 during rotor 12 rotation, which may include heated or superheated gasses created during use of the braking assembly, is effectively "scraped off" of surface 21 of rotor 12 by vane or vanes 20 (as suggested by the arrows) during rotation of surface 21 when vane or vanes 21 are in close proximity thereto as shown (the boundary layer, of course, reestablishes itself immediately downstream, but is typically substantially cooler).

The positioning structure may be configured and mountable so that vane or vanes 20 are fixedly positioned in close proximity to the swept area of the rotational braking surface 21 (as shown in FIG. 1) or are brought into close proximity to surface 21 during braking assembly use (as discussed below) so that the boundary layer adhered at braking surface 21 during rotor 12 rotation is intercepted and redirected. Once selected, angular disposition should be the same for all vanes 20 deployed in a particular installation.

Also common to all such variations is the preferably concave configuration of vanes 20, the concavity creating a channel (along the length of each vane 20) for directing fluid flow away from surface 21 of the rotor 12 in combination with selected angled vane deployment. The length of elongated bodies 30 (between ends 31 and 32) of vanes 20 are preferably selected so that the vane extends angularly entirely across swept area 22, with opposed leading (positionable adjacent to surface 21) and trailing surfaces extending between the ends at each side of the elongated body.

A particularly effective variant of vane 20 is illustrated in greater detail in FIGS. 3 and 4. As shown, elongated body 30 of vane 20 is curved and extends beyond inner edge 23 of swept area 22 at outermost extent 35 of vane end 31. Cooler air moving with rotor 12 inboard of inner edge 23 of swept area 22 is thus intercepted and directed as illustrated by arrows showing the airflow direction. Airflow engaged by the area 35 of vane 20 is guided into swept area 22 to aid in directing airflow from swept area 22 of rotor 12 along vane 20 as shown by arrows indicating flow.

Figure 5:
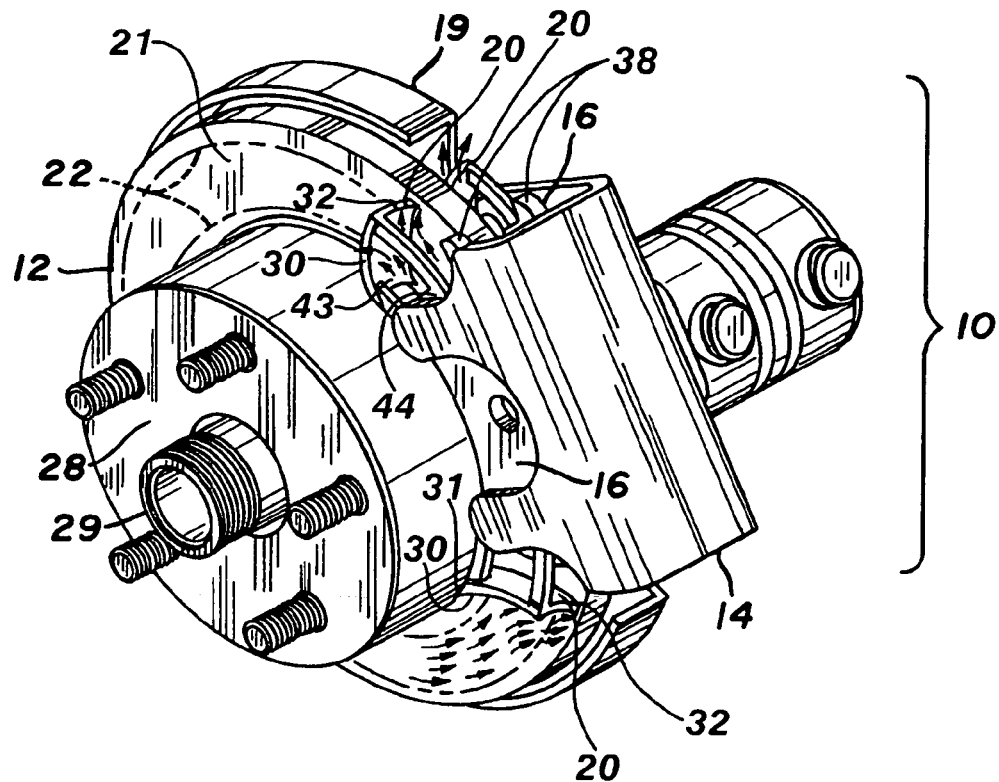
FIG. 5 is a perspective view of a brake assembly having friction pads carrying the vanes of the present invention.
Figure 6:
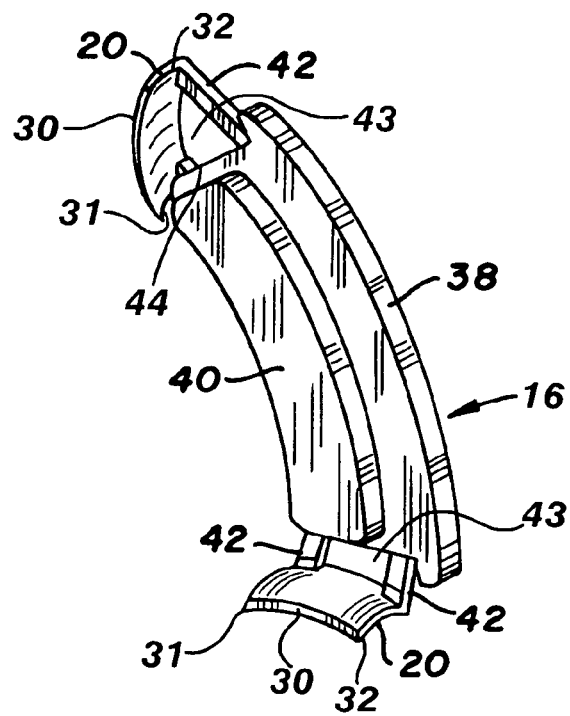
FIG. 6 is a perspective view of a friction pad as shown in FIG. 5.

As shown in FIGS. 5 and 6, vanes 20 can be configured for securement to a friction pad mounting support to be carried by and move with friction pad assembly 16 (i.e., mounted for controllable articulation with assembly 16). Vanes 20 (having the same basic elongated body configuration substantially as discussed above) are preferably mounted directly (either individually or together utilizing an intermediary mounting plate) to friction pad mounting plate 38 for movement with the friction pad 40.

Friction pad 16 conventionally includes mounting plate (or support) 38 and friction material pad 40 as shown in FIG. 6. Vanes 20 (one at each end of mounting plate 38) are conveniently secured to friction pad mounting plate 38 by arms 42 extending between mounting plate 38 and vanes 20 (one end of each arm 42 connected to mounting plate 38 and the opposite end of each arm 42 connected with vane 20). When friction material 40 is urged into contact with rotor 12 as shown in FIG. 5, vane 20 is also moved closely adjacent rotor 12 for effective interception and removal of the boundary layer thereat as discussed above. Light contact of vane 20 against rotor 12, either upon initial installation or with wear of friction material 40, is not objectionable since a close clearance will promptly be established by wear of the contacting edge surface of vane 20.

Arms 42 are preferably somewhat flexible to accommodate wear of the friction material 40, and also run-out of the rotor 12. In order to achieve such accommodation, each arm 42 is preferably constructed of low heat conductivity material and/or is otherwise configured to thermally isolate friction pad 40 from the hot gases flowing over vane 20. In such a pad-carried arrangement, vanes 20 may preferably be constructed to wear at a substantially equal rate as friction pad material 40.

Openings 43 established between arms 42 at each vane 20 also provides a fluid passage particularly useful at vane 20 at trailing end 44 of friction pad assembly 16. This opening allows fluid from the boundary layer to move outwardly of braking surface 21 through opening 43 (as suggested by the arrows in FIG. 5) responsive to selected vane angling, particularly vane angling in the rake direction.

While vane 20 is illustrated in both leading and trailing positions as shown by the flow arrows indicating rotation of rotor 12, it is to be understood that vane 20 could similarly be in only a leading or trailing position. A trailing vane 20 at trailing end 44 of friction pad assembly 16 is most effective for removing thermal energy before such energy is permitted to be conducted to the interior of rotor 12. A leading vane 20 such as shown at the bottom of FIG. 6 is most effective for diverting heated gases and entrained particles from rotor 12 before such harmful substances can contact friction material 40.

Since the friction pad disrupts the boundary layer, the trailing vane 20 should be spaced arcuately from friction pad 40 a sufficient distance to allow the boundary layer to reform. In general, the spacing varies depending upon use, with the spacing being somewhat greater for higher speed applications than for lower speed applications. Spacings may be determined empirically by those of skill in the art in order to optimize the spacing to be utilized.

The mounting of vane or vanes 20 for movement with friction pad 14 is still deemed a stationary mount for purposes of definition, since support for the friction pad mounting plate 38 is ultimately found in the stationary components of the overall vehicle assembly. By way of definition, stationary mounting may be defined as a mount which is nonrotating relative to rotor rotation. To achieve the objectives of this invention, so long as the vane does not rotate with the rotor and is positioned or positionable in the boundary layer, it is functional. Axial motion of the mounting plate 38 is utilized for the typical interaction with the rotary components including rotor 12.

The utilization of the friction pad mounting plate 38 as a support for vanes 20 provides additional advantages as well. In this connection, the arrangement of FIGS. 5 and 6 may be utilized as a feature in after-market products, with the arrangement of FIGS. 5 and 6 facilitating ease of assembly. Vanes 20 mounted on friction pad assembly 16 also have the advantage of accommodating rotor run-out in that the extent of friction pad movement is responsive to the run-out and in turn moves an attached vane relative to the rotor position.

It should be appreciated that, while friction pad mounting plate 38 is illustrated herein as the support for vanes 20, the vane mounting plate utilized in accord with this invention could be configured for aftermarket sales as a separate vane mounting plate having vanes 20 attached or attachable thereto and which is then installed on the friction pad mounting plate 38 already in place on the vehicle.

Figure 7:
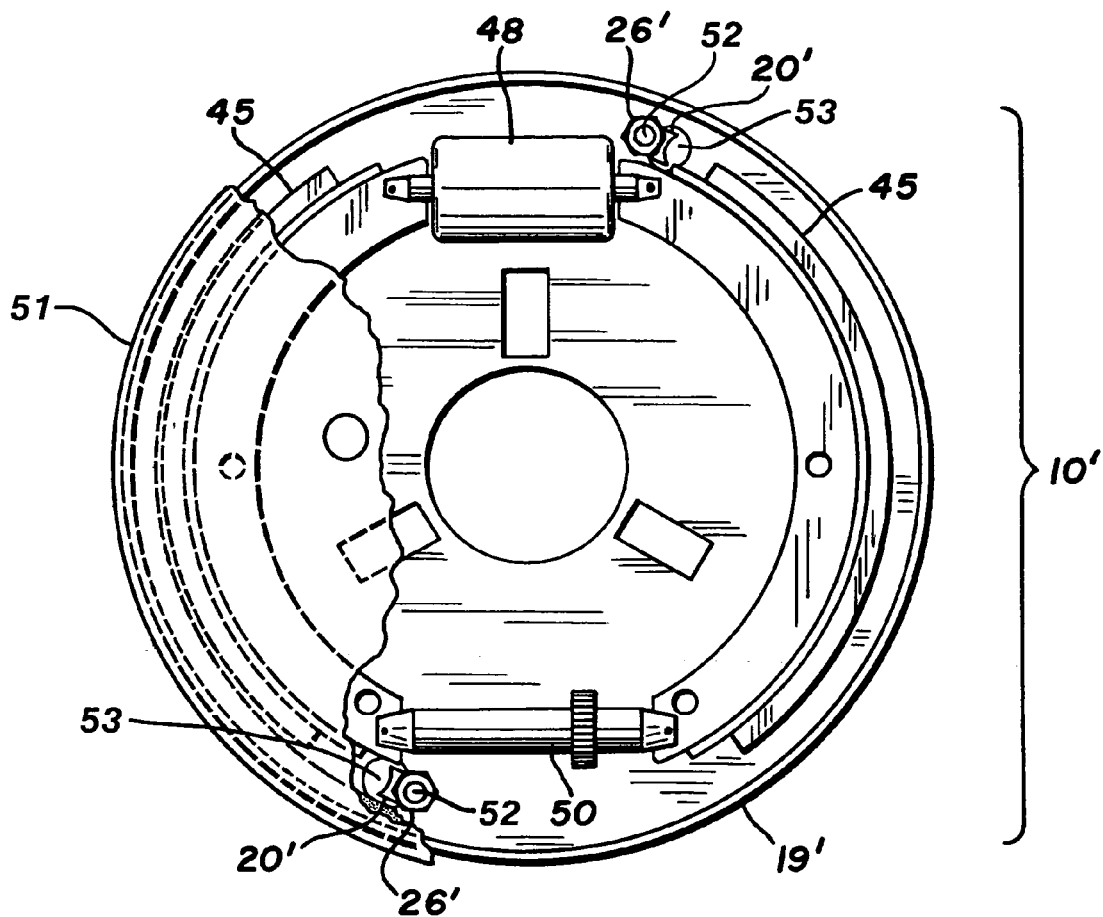
FIG. 7 is a front partially cut away view of an expanding shoe brake assembly incorporating vanes in accordance with the present invention.
Figure 8:
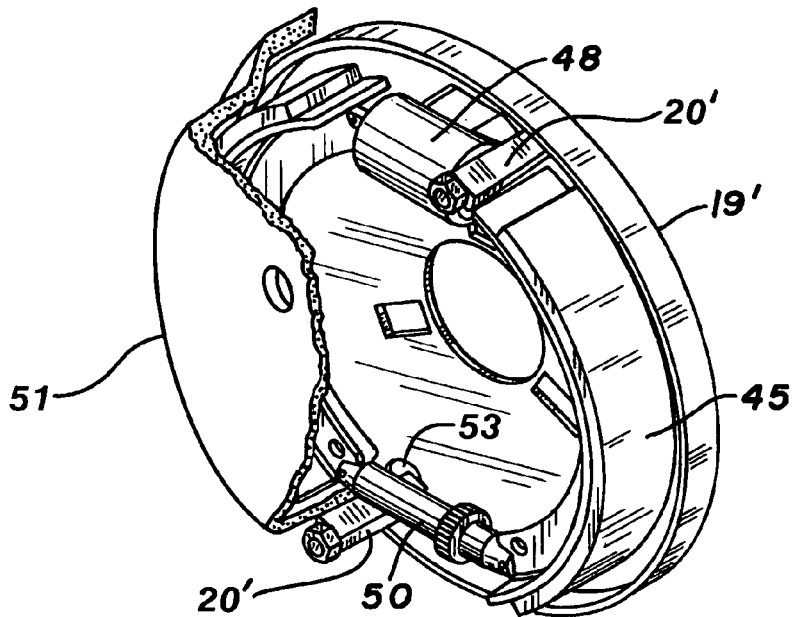
FIG. 8 is a perspective view of the structure as shown in FIG. 7.
Figure 9:
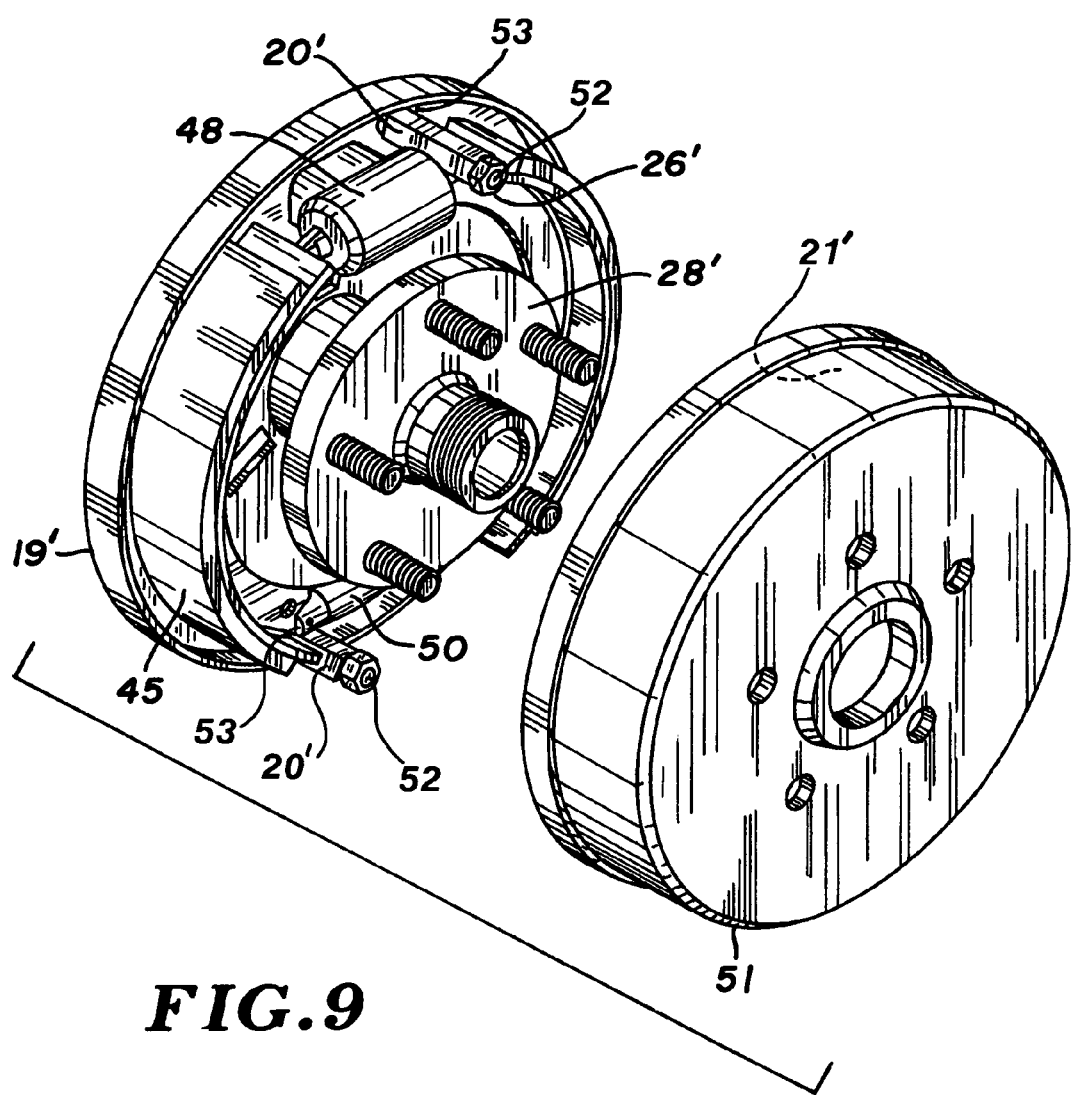
FIG. 9 is an exploded perspective view of the assembly of FIGS. 7 and 8 mounted on a hub and including a brake drum.

While vanes 20 are particularly effective when employed in conjunction with disk brakes as illustrated in FIGS. 1 through 6, the concept is also applicable to other brake configurations such as the expanding shoe assembly illustrated in FIGS. 7, 8 and 9 wherein the assembly is generally indicated by numeral 10'. As is well known in the art, assembly 10' includes friction shoes 45 carried on backing plate 19' by slave cylinder 48 and adjusting mechanism 50. Friction shoes 45 are urged by slave cylinder 48 against rotational braking surface 21' at drum 51 (carried on hub 28').

Friction shoes 45 bearing against surface 21' at drum 51 generate hot gases which are carried by drum 51 in the boundary layer as discussed above and by centrifugal force as well. Vanes 20', carried adjacent the trailing edges of each of friction shoes 45 on threaded rods 52 and secured by nuts 26', are positioned adjacent openings 53 in backing plate 19' to intercept and conduct such gases through openings 53 formed in plate 19'. Vane 20' is angled across drum 51 as discussed hereinabove to induce lateral flow through opening 53 to the ambient.

As may be appreciated, this invention provides improved brake assembly cooling by effectively intercepting and redirecting the boundary layer of fluid moving with the rotating braking surface of the brake assembly away from the braking surface. This is preferably accomplished by positioning an angularly disposed vane in close proximity to the braking surface (partially within the boundary layer). Individually adjustable vanes provide enhanced heat dissipation with greater complication. Arrayed vanes for one side of a disc rotor, or an array for both sides having an open segment therebetween to allow installation, provides simpler adjustment. The vanes for one side can be integrally formed in the backing plate with provision for heat isolation from the spindle and hub. Vane positioning or guiding surfaces may be formed on the vane to guide the vane while in close contact with the rotor. This allows for dynamically controlled spacing of the vane which accommodates rotor run-out.

What is claimed is:

1. A cooling assembly for a rotational braking surface wherein a swept area at the rotational braking surface is defined by braking engagement of a friction pad with the rotational braking surface, said cooling assembly comprising:
   a first cooling vane having a body of a selected length; and
   a first positioning structure associated with said first vane for nonrotational positioning of said first vane in an angled disposition adjacent to the swept area of the rotational braking surface, said positioning of said first vane selected to intercept a boundary layer of fluid associated with the rotational braking surface and the swept area, said length of said body of said first cooling vane selected so that said body extends across the swept area, whereby said first cooling vane directs at least a part of said boundary layer of fluid away from the swept area of the rotational braking surface during rotation thereof.

2. The cooling assembly of claim 1 wherein said first positioning structure includes at least a first flexible arm connected at one end to said first cooling vane.

3. The cooling assembly of claim 1 wherein said length of said body of said vane is selected so that when said vane is positioned at the swept area of the rotational braking surface said body extends angularly entirely across and beyond the swept area adjacent thereto.

4. The cooling assembly of claim 1 wherein said association of said positioning structure with said vane is selected to establish said angled disposition relative to the rotational braking surface in a rake direction.

5. The cooling assembly of claim 1 wherein said first cooling vane has a concave configuration, said concave configuration establishing a channel for directing fluid flow away from the rotational breaking surface.

6. The cooling assembly of claim 1 further comprising a mounting plate adapted for attachment of a friction pad thereto and positionable adjacent to the rotational braking surface for braking engagement of the friction pad with the rotational braking surface, said first positioning structure being connected with said mounting plate so that said first vane is movable with said mounting plate.

7. The cooling assembly of claim 6 wherein said first positioning structure includes at least one flexible arm connected to said mounting plate at one arm end and to said vane at an opposite arm end.

8. The cooling assembly of any of claims 1, 2, 4, 5, or 6 further comprising at least a second vane and at least a second positioning structure associated with said second vane for nonrotational positioning of said second vane spaced from said first vane and in an angled disposition relative to the rotational braking surface selected to intercept and redirect away from the rotational braking surface a boundary layer of fluid associated with the rotational braking surface during rotation thereof.

9. The cooling assembly of any of claims 1, 2, 4, or 5 wherein said association of said positioning structure with said vane is selected to allow establishment of said angled disposition relative to the rotational braking surface in a radial direction.

10. A braking surface cooling assembly for use in association with a vehicle brake assembly including a nonrotational mounting support, a rotary braking surface having a normal forward direction of rotation, and a friction pad mounted for controlled intermittent engagement with the rotary braking surface so as to define a generally annular swept area between the pad and the braking surface, wherein an adherent fluid boundary layer moves with the rotary braking surface, said braking surface cooling assembly comprising:

at least one fluid guiding cooling vane securable to the mounting support, said cooling vane including an elongated body having opposed ends with opposed leading and trailing surfaces extending between said ends of said elongated body, said elongated body of said vane being adapted for positioning relative to the rotary braking surface angled in at least one of a radial direction and a rake direction with said leading surface of said elongated body immediately adjacent to the swept area of the rotary braking surface to intercept and redirect at least a portion of the fluid boundary layer moving with the rotary braking surface at the swept area, said elongated body having a length at least sufficient to extend entirely across the swept area adjacent thereto.

11. The braking surface cooling assembly of claim 10 wherein said elongated body of said vane is generally concave toward the normal forward direction of rotation in at least one of length and width dimensions.

12. The braking surface cooling assembly of claim 10 wherein the vehicle brake assembly includes a rotary disc having the rotary braking surface thereat and wherein the mounting support has the friction pad attached thereto, the mounting support being adapted for axial motion to bring the friction pad into and out of braking contact with the rotary braking surface of the rotary disc, said braking surface cooling assembly further comprising a second fluid guiding cooling vane, said vanes including means for coupling said vanes to the mounting support in a spaced relationship relative to one another.

13. The braking surface cooling assembly of claim 10 wherein the swept area is delineated by radially spaced apart inner and outer edges, said elongated body length being sufficient to extend beyond at least the inner edge of the swept area adjacent thereto.

14. The braking surface cooling assembly of claim 10 wherein said vane is positionable with the leading surface disposed at an angle radially at said the braking surface.

15. A method of enhancing the performance of a brake assembly comprising a rotary braking member, at least one nonrotating friction pad mounted for controlled intermittent braking engagement with said rotary braking member, and at least one annular swept area defined on said braking member by the area contactable by said friction pad, said rotary braking member including said annular swept area having a boundary layer adhered thereto, said method comprising the steps of:

rotating said braking member and adhered boundary layer;

parting at least a portion of said rotating boundary layer from said braking member at said swept area; and guiding the flow of said portion of said boundary layer to a position spaced from said swept area, whereby a cooling flow of air is induced over said braking member at said swept area.

16. The method of claim 15 wherein said boundary layer is parted and guided by impinging the boundary layer against at least one nonrotating vane extending into said boundary layer and positioned obliquely across said swept area.

17. The method of claim 16 wherein said friction pad is frictionally engaged against said braking member to convert the kinetic energy associated with said rotating braking member to heat energy, said heat energy being transferred to said braking member and said boundary layer which is at least in part flowed by said vane away from said swept area of said braking member, and wherein said portion of said boundary layer parted from said braking member is replaced with cool air.

18. The method of claim 17 wherein said vane is secured at and movable with the friction pad during engagement of said friction pad with said braking member.

19. The method of claim 16 wherein said vane is concave toward said impinging boundary layer in at least one of the length and width dimensions and extends into said boundary layer beyond both sides of said swept area.

20. The method of claim 16 wherein said vane is disposed at a rake angle back from said braking member and said method includes initially removing said boundary layer away from said braking surface onto said vane and thereafter moving said removed boundary layer along said vane.

\* \* \* \* \*